United States Patent
Hession et al.

(10) Patent No.: US 8,121,269 B1
(45) Date of Patent: Feb. 21, 2012

(54) SYSTEM AND METHOD FOR AUTOMATICALLY MANAGING PARTICIPATION AT A MEETING

(75) Inventors: Patrick Hession, Mervue (IE); Tony McCormack, Mervue (IE); John Costello, Mervue (IE); Frank McGuire, Mervue (IE)

(73) Assignee: Rockstar Bidco LP, New York, NY (US)

( * ) Notice: Subject to any disclaimer, the term of this patent is extended or adjusted under 35 U.S.C. 154(b) by 1564 days.

(21) Appl. No.: 11/395,110

(22) Filed: Mar. 31, 2006

(51) Int. Cl.
*H04M 11/00* (2006.01)

(52) U.S. Cl. .................................. 379/93.01; 709/204

(58) Field of Classification Search .... 348/14.01–14.08; 709/204

See application file for complete search history.

(56) References Cited

U.S. PATENT DOCUMENTS

| | | | |
|---|---|---|---|
| 6,321,221 B1 * | 11/2001 | Bieganski | 705/27 |
| 6,480,885 B1 * | 11/2002 | Olivier | 709/207 |
| 6,931,111 B1 * | 8/2005 | Coffee | 379/201.12 |
| 7,051,072 B2 * | 5/2006 | Stewart et al. | 709/204 |
| 7,570,606 B2 * | 8/2009 | McCormack et al. | 370/260 |
| 2003/0154072 A1 * | 8/2003 | Young et al. | 704/9 |
| 2004/0243672 A1 * | 12/2004 | Markki et al. | 709/204 |

* cited by examiner

*Primary Examiner* — Curtis Kuntz
*Assistant Examiner* — Maria El-Zoobi
(74) *Attorney, Agent, or Firm* — Barnes & Thornburg LLP

(57) ABSTRACT

A participant managing system which identifies potential invitees to a conference. A storage means maintains storing records of associations of persons at least to one or more keywords. During the preparation of the conference the system responds to the user's input of key words by identifying persons. The user is not obliged to make any selection of persons, only a selection of subjects by key words.

38 Claims, 3 Drawing Sheets

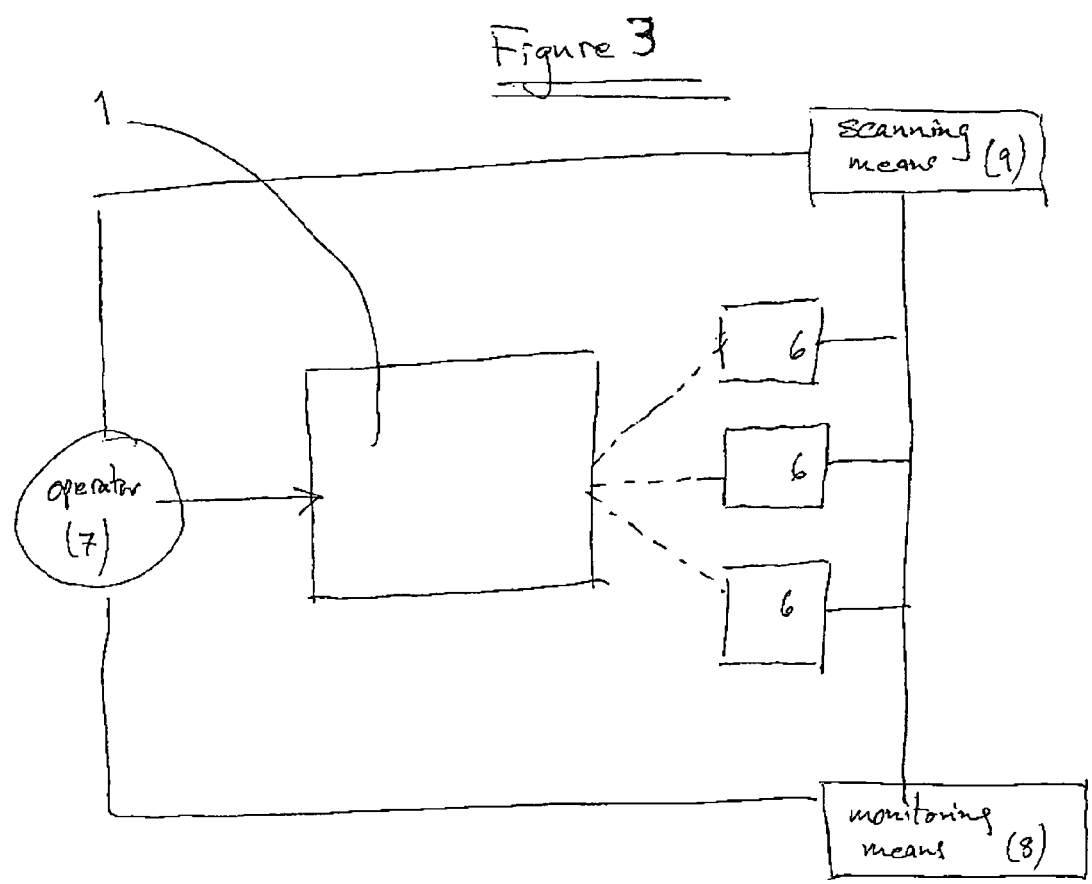

SYSTEM AND METHOD FOR AUTOMATICALLY MANAGING PARTICIPATION AT A MEETING

This invention relates to a system and method for managing participation at a teleconference and automatically inviting participants to the event in accordance with the topics associated with the participant.

The invention relates primarily to video and teleconferences, but is also related to meetings where the participants are physically present. It relates mainly to the means and method of automatically selecting participants according to the subjects to be discussed at the conference or to the subjects already being discussed if the conference has already started.

Organising a conference for multiple participants who may remotely located can be laborious and time-consuming. E-mail meeting organisation packages have taken some of the work out of the more tedious aspects of organising such an event: dispatching invitations to a plurality of invitees, with the possibility of arriving at a consensus for a time and/or venue have been made easier. Determining a mutually convenient time and/or location can be quickly finalised as long as all invitees have access to the same package.

One of the initial steps in organising such a conference is the selection of participants or invitees: the prime factor in becoming an invitee is the relevance of the topic of the meeting to the person in question. One is invited to attend a meeting if one can contribute to or benefit from the discussion.

However, knowing whose participation to a meeting could increase the success of a meeting is not always a straightforward exercise, especially if the candidate group is very large or the candidates are widely spread geographically. The meeting organiser may also be new to or unfamiliar with the group or not be in a position to know who the most appropriate persons are. Identifying the persons for which a particular subject may have some relevance can therefore in itself be a laborious task.

There is therefore a need to reduce or eliminate the work required of the decision maker to identify the persons for whom a conference subject may be relevant.

The object of the present invention is to provide a system which identifies potential invitees, by associating each topic with a number of potential invitees, such that the system operator (the conference organiser) merely has to state the subject or subjects of the meeting and the persons concerned are automatically identified.

The invention relates primarily to video and teleconferences, but is also related to meetings where the participants are physically present. It relates mainly to the means and method of selection of persons based on the relevance of the subject or planned subjects to them.

It is a system which is context-aware, in that the system links the context of a discussion to potential participants.

SUMMARY OF THE INVENTION

In a first aspect of the invention a participant managing system is provided comprising: a means for storing records of associations of persons at least to one or more keywords; a means for inputting data; a means for selecting from the maintaining means persons associated with the input data; and a means for outputting the selection. The input are key word data or person data, wherein the keywords may comprise any one or a combination of subjects, classifications or professional expertise etc.

The foregoing and further features of the present invention will be more readily understood from the following description of preferred embodiments, provided by way of example only and without limitation to the scope of the present invention as set out in the appended claims, with reference to the foregoing figures.

BRIEF DESCRIPTION OF THE DRAWINGS

FIG. 3 illustrates a further embodiment of the invention during a conference session.

DETAILED DESCRIPTION OF THE PREFERRED EMBODIMENT

Figure 1:
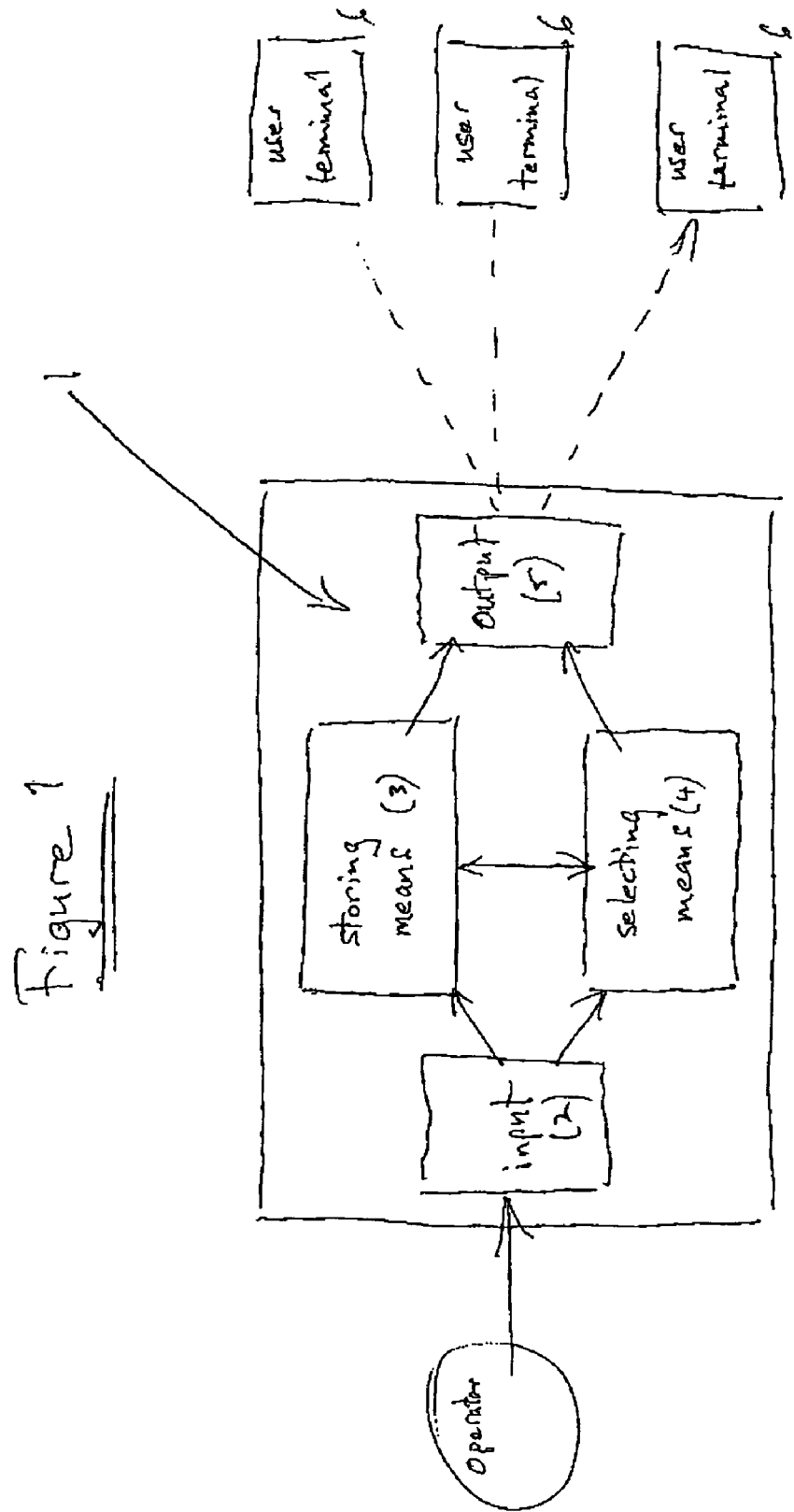
FIG. 1 illustrates the main components of the system.

The invention according to claim 1 is illustrated in FIG. 1. The system (1) includes an input (2) a storage means or data source (3), a selection means (4) and an output (5). The input (2) means communicates with the selection means (4) and extracts information from the storage means (3).

The invention eliminates a large amount of the preparation work for a conference by selecting potential participants according to topics associated with them: the conference organiser merely has to select the topics for discussion and the system replies with a list of potential participants, each of whom are associated with the input topics. The organiser then makes his selection from the list of potential participants and the invitations, thus creating a list of invitees.

The system stores names of persons and topics or subjects that are of interest to them or topics or subjects in which they hold a special expertise. The storage means (3) receives the topics in the form of key words and extracts the names of persons who are associated with the input words. For example, the operator (7) may be planning a culinary conference. The operator, may, for some reason, not be in a position to identify the appropriate persons himself, because, for example, he is new to the company or the persons concerned are located remotely. It may also be that the operator does know the appropriate persons, but they are too numerous or he does not have sufficient time to input all their names. In short there may be numerous reasons why it is easier for the operator to input a limited number of subjects or topics rather than a greater number of names of participants. The advantage of the proposed system is that the operator saves time and resources. An additional advantage of the system is that the operator is less dependent on his own memory of the persons concerned, thereby avoiding omissions and errors of essential contributors.

Figure 2:
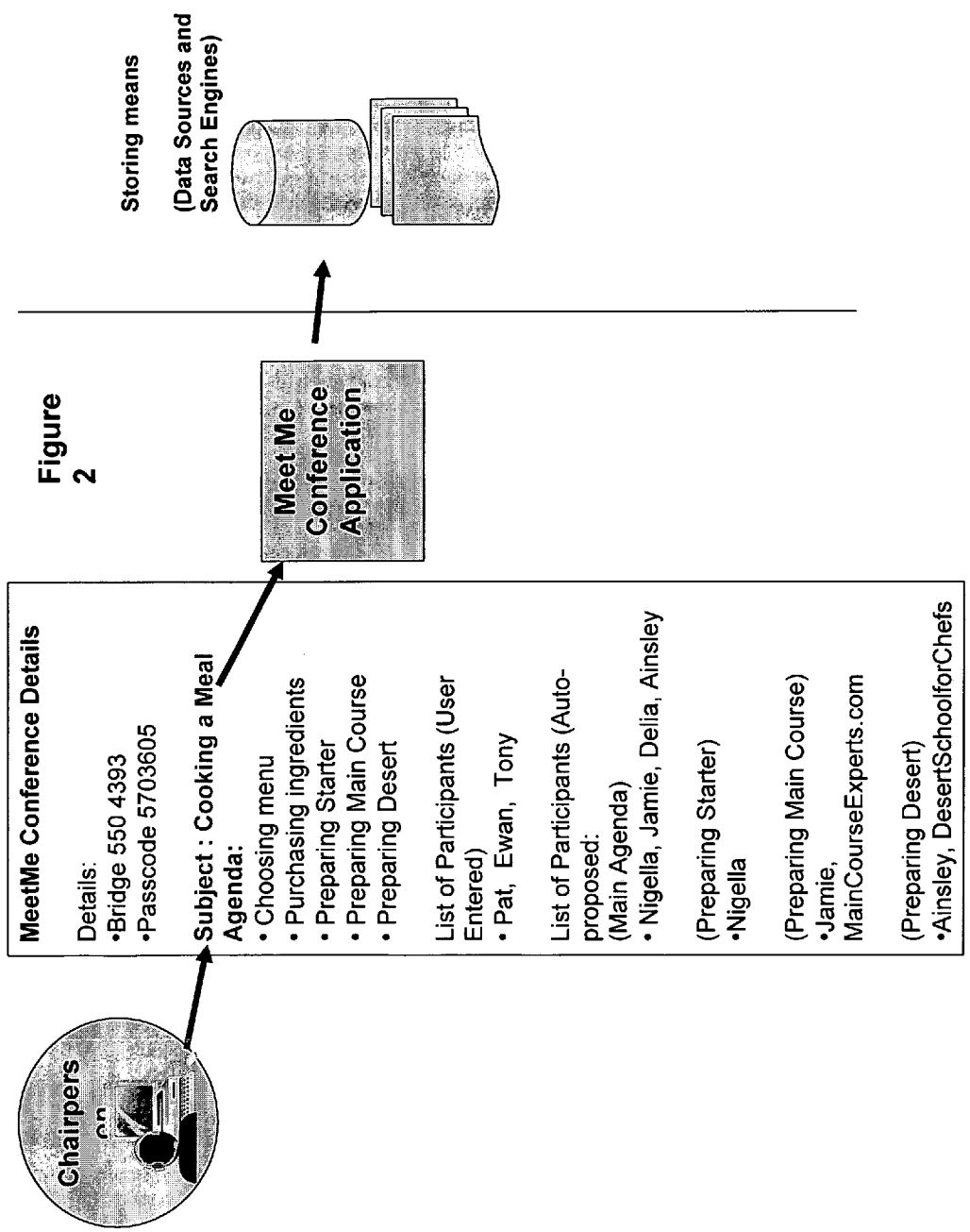
FIG. 2 illustrates a typical input of conference details including keywords.

FIG. 2 illustrates in general terms how the system functions. The operator simply has to input appropriate keywords associated with the forthcoming meeting. Using again the example of an operator planning a preparing a cookery conference, the input words could, for example, be "choosing a menu", "cooking a meal", "purchasing ingredients" or "preparing starter". Each person record stored in the system will have a number of associated topics or subjects: the database will then extract those person records for which there is there is an association with the input data "choosing a menu", "cooking a meal", "purchasing ingredients" or "preparing starter". The persons extracted from the system will then be entered on a list of candidate participants. In FIG. 1 the system has extracted the names Nigella, Jamie, Delia, etc. The list is output to the operator for him to select the candidates who will receive an invitation; he merely needs to scroll through the suggested names and select the persons who he deems appropriate. Additionally or alternatively, the operator may input a classification in the form of a professional expertise to identify, for example, potential participants who are recorded as being chefs, i.e. who are recorded as having an expertise specific to a conference topic.

There remains the possibility that the list proposed by the system is supplemented by the operator. Thus along with those selected by the system the operator may also add some further users known to him, such as Pat, Ewan and Tony. The system will allow both user input and its own proposals to be combined.

The system also envisages searching for potential participants in other data sources other than its own data storage, ie other internal databases (such as that managed by human resources), external databases, specialist internet search engines The database may also hold further information associated with each person such as location, internal rank or grade, etc. In FIG. 2 the names extracted and reproduced in the candidate list could therefore indicate that Nigella and Jamie are respectively Trainee Chefs, both being based in New York, while Ainsley is Celebrity Chef and works in London. The reader will appreciate that other relevant data could be associated with each person record on the database, such as security clearance or level, or identity of immediate superior. At a further level of complexity the system may also maintain levels of relevance of any particular keyword to a particular person: in this sense the word "ingredients" could induce a Level 2 indicator for Nigella and Jamie, while the relevance of "ingredients" for Ainsley is Level 1.

The operator retains the possibility of adding new records to the database. It could be that a new person joins the firm and the data source requires updating.

The operator also has a capacity to amend existing records, such that, for example, new associations could be added to existing records or new data could be input in a particular record. For example, it could be that the record for Claire has no association with "ingredient" because, for example, she is new to the company or she works in a nominally non-culinary area and her linkage to culinary matters has only recently been established. Similarly, Tony may have relocated from New York to London or he may have been promoted from trainee to manager and his record requires updating to show his new location and/or rank.

Moreover, there may be a need to supplement the candidate list output on the basis of the association of persons with particular keywords, without updating the records in the database. For example, the candidate list output on the basis of the words "choosing a menu", "cooking a mean", "purchasing ingredients" or "preparing starter", may omit a person vital to the success of the conference, but who nevertheless has no association with the key words. Taking again the operator planning the culinary conference (with the aforementioned key words), it may be desirable that the marketing director, who is normally not linked to the relevant key words, is present. The operator therefore has the possibility of supplementing the output candidate list, adding any persons not automatically extracted from the data source.

One can also consider any conference as a series of separate discussions, with varying levels of interest or relevance to the individual participants. A high-level conference may encompass a vast number of subjects over an extended period of time, but only a core group of participants are interested in all the subjects covered. This would mean that for the other participants to the conference the relevance of the conference varies according to the current subject of discussion. In the extreme case it could be that the meeting has no interest at all for a particular participant except for an isolated discussion which is limited in time. It is a further object of the current invention to alert users of the system to the topic under current discussion and for them to tailor their participation to the conference accordingly. This permits greater efficiency in the allocation of time and resources.

The non-uniform relevance over time is addressed in a number of aspects of the invention. Firstly, it could be the organiser of the event who, from the outset, divides the overall event into a series of discussions or sub-meetings, such that he can then input key words for each sub-meetings in the way already previously described. In accordance with the aspects already disclosed, the system responds by producing a number of candidate lists for each of the sub-meetings, such that participation varies according to the topic currently under discussion.

Secondly, the topic of discussion may vary in an unexpected or unscheduled way, such that the timings of the individual discussions are not known to the organiser in advance of the event. The flow of the discussion can be monitored by the operator such that he can input the keywords into the system (as described previously) in accordance with the variation in the subject. Accordingly, the system responds to each input by the operator with a new candidate list, the operator makes his selection and the list of invitees is drawn up by the system and invitations dispatched. Participants can come and go in accordance with messages sent out by the operator in response to lists generated by the system after his input of the current key words. There remains also the possibility that the operator will input specific names, irrespective of the names selected from the data source. This would provide combination of directly input names and names proposed on the basis of key words Alternatively, the system can automatically monitor the discussion and the current subject, as illustrated in FIG. 3, without the operator of the system having to intervene by repeatedly inputting new key words. In this mode the system notes the words used by the participants to the discussion using a speech recognition means and automatically identifies the keywords in the current discussion. This allows the system to make further extractions from the database based on the new keywords as they arise and to produce new candidate participant lists. The new lists can then be submitted to the operator as before.

For both of these alternatives, instead of submitting candidate lists to the operator, the system can be configured such that alerts are sent automatically to the potential candidate directly without any further selection by the operator. This not only reduces the input of and saves the resources of the operator, but also reduces the time till receipt by the invitee and to alert important potential participants (eg relevant experts) who have been overlooked previously, but their contribution is then urgently required. This mode of operation would also be appropriate where a large number of topics is envisaged and hence a high "turnover" of participants.

There is no reason why this process would not lead to the multiple entries of participants who join, then leave and then re-join the conference, being alerted directly or indirectly, when their topics are being discussed. Relevancy peaks and repeat relevancies may induce a high circulation of participants.

The conference management system also allows the operator to benefit from other conferences already arranged. The operator will be alerted to the existence of previous conferences with the same or a similar title or content. In such cases the system could make available minutes from the earlier meeting and also give an indication (in quantitative terms) of the degree of overlap of the two conferences.

A further benefit of the current invention is the possibility of utilising data derived from each completed conference to update the database for use in subsequent events. This functions either in the automatic mode described above, whereby, the monitoring system itself identifies the keywords or in a manual mode whereby the operator inputs new data. In both cases new topics, new persons and new associations of topics to associations can be used to update the database records, providing a more accurate basis for future participant selections in subsequent meetings.

As described previously, the storage means could be a database with data supplemented by external or specialist data sources, etc. The selection means could be a search engine. The storing means may also hold further information associated with each person such as location, internal rank or grade, relevance level for particular keywords, etc. In a further aspect of the invention the operator of the system may himself assign variables to individual participants. This further adds to the efficiency of the participant identification process and reduces the time required to identifying the final participant list. This feature can also be used to assign variables to individual participants for use during the discussion itself, such as speaker status or merely observer status (without right of intervention). Similarly the operator may assign blocking facilities to individual participants, giving the chairman of the meeting the power to cut the microphone, or where desired, some participants may be given full speaker rights, meaning that the microphone cannot be removed from them during their intervention.

The system has been described in broad terms, but operates by means of appropriate hardware and software designed to facilitate the system herein described.

The reader will appreciate that the modifications and variations may be made within the scope of this invention which is defined by the appended claims.

The invention claimed is:

1. A participant managing system comprising:
    a means for storing records of associations of persons at least to one or more keywords;
    a means for inputting keywords;
    a means for selecting from the storing means persons associated with the input keywords;
    a means for outputting the selection; and
    a monitor for monitoring which persons are actively linked into an active conference and for maintaining a list of those actively linked into the active conference session;
    wherein the means for selecting is further operable to select from persons not in the list of active participants during an active conference session in accordance with further keywords.

2. A participant managing system as in claim 1 wherein the keywords may comprise any one or a combination of subjects, classifications or professional expertise.

3. A participant managing system as in claim 1 wherein the selecting means selects persons based on a search for the key words in the storing means.

4. A participant managing system as in claim 1 wherein the selecting means selects persons based on searches in external information sources and/or internet search engines.

5. A participant managing system as in claim 1, wherein the input means is further operable to receive person data and wherein the output means outputs a list of candidate participants, this being a list of persons corresponding to either the persons identified by the selecting means or to person data directly input into the input means.

6. A participant managing system as in claim 5, wherein the input means is operable to receive an operator selection of participants from the list of candidate participants, to form a participant list.

7. A participant managing system as in claim 6 further comprising an invitation dispatching means, which, on activation, automatically submits details of a future conference to persons on the participant list.

8. A participant managing system as in claim 1 wherein the selecting means selects persons based on a search for the key words in the storing means.

9. A participant managing system as in claim 1 wherein the input means is operable to receive names of persons not in the list of active participants.

10. A participant managing system as in claim 9 further comprising an invitation dispatching means which dispatches invitations automatically either to those persons selected or input by an operator.

11. A participant managing system as in claim 1, further comprising a conference scanning means which identifies the words used by each participant during an active conference session.

12. A participant managing system as in claim 11, wherein the scanning means comprises speech recognition means and wherein the system further comprises identification means for identifying a current topic of the conference, based on the keywords identified by the scanning means.

13. A participant managing system as in claim 12 wherein the identifying means identifies persons associated with the current topic, which do not correspond to the list of active participants and the output means outputs these persons as a list of potential additional participants.

14. A participant managing system as in claim 13 further comprising an invitation dispatching means which is operable to dispatch invitations to the persons in the list of potential additional participants or to dispatch invitations to those persons selected by an operator from the list of potential additional participants.

15. A participant managing system as in claim 1, wherein at the conclusion of a conference new keywords and new participants are identified and a storing means update is prepared accordingly.

16. A participant managing system as in claim 1, wherein at the conclusion of a conference new associations of topics to persons and a storing means update is prepared accordingly.

17. A participant managing system as in claim 15 wherein the update is communicated to an operator via the output means in the form of a prompt, wherein the input means is operable to receive the response of the operator on whether to update the storing means.

18. A participant managing system as in claim 17, wherein if the storing means is updated, the updated storing means is matched to any scheduled subsequent conferences.

19. A method for managing participants, comprising the steps of:
    maintaining records of associations of persons at least to one or more keywords in a storing means;
    receiving input key words;
    selecting from the maintained records persons associated with the input key words;
    outputting the selection;
    monitoring which persons are actively linked into an active conference and maintaining a list of those actively linked into the active conference session;
    receiving further key words;

further selecting from persons not in the list of active participants during an active conference session in accordance with the received further key words; and outputting the further selection.

20. A method for managing participants as in claim 19 wherein the keywords may comprise any one or a combination of subjects, classifications or professional expertise.

21. A method for managing participants as in claim 19 wherein persons are selected based on a search for the key words in the storing means.

22. A method for managing participants as in claim 19, wherein the selecting step further comprises searching in external information sources and/or internet search engines and identifying persons associated with the keywords input.

23. A method for managing participants as in claim 19 wherein invitations are automatically dispatched to those persons selected or input.

24. A method for managing participants as in claim 19 further comprising receiving input person data and wherein the outputting step further comprises outputting a list of candidate participants, this being a list of persons corresponding to the persons either identified by the selecting step or to persons directly input into the input means.

25. A method for managing participants as in claim 24 further comprising an additional inputting step wherein a selection is made from the list of candidate participants, thereby forming a participant list.

26. A method for managing participants as in claim 25 further comprising, if authorised by an operator, the step of dispatching an invitation, which automatically submits details of a future conference to persons on the participant list.

27. A method for managing participants as in claim 19 further comprising the step of scanning the words used by each participant during an active conference session.

28. A method for managing participants as in claim 27, wherein the step of scanning comprises using speech recognition, and further comprising the step of identifying the current topic of the conference, based on the words identified by the scanning step.

29. A method for managing participants as in claim 28 wherein the identifying step further comprises identifying persons associated with a current topic which do not correspond to the list of active participants and outputting these persons as a list of potential additional participants.

30. A method for managing participants as in claim 29 wherein the outputting step further comprises alerting an operator to dispatch invitations to the persons in the list of potential additional participants.

31. A method for managing participants as in claim 30 wherein the outputting step further comprises automatically dispatching invitations to the persons in the list of potential additional participants.

32. A method for managing participants as in claim 19 wherein, at the conclusion of a conference, the method further comprises the step of identifying new topics and new participants and updating the storing means accordingly.

33. A method for managing participants as in claim 32 wherein the step of updating further comprises updating the storing means with new associations of topics to persons.

34. A method for managing participants as in claim 32 wherein the update is communicated to an operator in the form of a prompt, wherein the storing means is updated accordingly if the operator inputs his authorisation.

35. A method for managing participants as in claim 34, wherein if the storing means is updated, the updated storing means is matched to any scheduled subsequent conferences.

36. A computer program product comprising a computer readable medium for storing instruction code for implementing the method of claim 19.

37. A participant managing system comprising:
a means for storing records of associations of persons at least to one or more keywords;
a means for inputting keywords;
a means for selecting from the storing means persons associated with the input keywords; and
a means for outputting the selection;
a means for monitoring which persons are actively linked into an active conference and for maintaining a list of those actively linked into the active conference session;
a conference scanning means which identifies the words used by each participant during an active conference session and comprises speech recognition means; and
an identification means for identifying a current topic of the conference, based on the keywords identified by the scanning means;
wherein the identifying means identifies persons associated with the current topic, which do not correspond to the list of active participants and the output outputs these persons as a list of potential additional participants.

38. A method for managing participants, comprising the steps of:
maintaining records of associations of persons at least to one or more keywords in a storing means;
receiving input keywords;
selecting from the maintained records persons associated with the input keywords;
outputting the selection;
monitoring which persons are actively linked into an active conference and maintaining a list of those actively linked into the active conference session;
scanning the words used by each participant during an active conference session;
identifying the current topic of the conference, based on the words identified by the scanning; and
identifying persons associated with the current topic which do not correspond to the list of active participants and outputting these persons as a list of potential additional participants.

* * * * *